June 5, 1928. 1,672,359

D. B. WHISTLER

WINDOW AND THE LIKE

Filed Feb. 12, 1925  5 Sheets-Sheet 1

June 5, 1928.

D. B. WHISTLER 1,672,359

WINDOW AND THE LIKE

Filed Feb. 12, 1925　　5 Sheets-Sheet 2

INVENTOR

David B. Whistler

June 5, 1928.  D. B. WHISTLER  1,672,359

WINDOW AND THE LIKE

Filed Feb. 12, 1925  5 Sheets-Sheet 5

INVENTOR

Patented June 5, 1928.

1,672,359

UNITED STATES PATENT OFFICE.

DAVID B. WHISTLER, OF DAYTON, OHIO.

WINDOW AND THE LIKE.

Application filed February 12, 1925. Serial No. 8,630.

This invention relates to improvements in windows, having particular reference to double-hung windows, i. e. counter-balanced windows comprising upper and lower sash adapted to be adjusted in opposite vertical planes one relative to the other.

In the conventional window of this type, the sash overlap one another at the meeting rails, that is to say, the lower rail of the upper sash overlaps or overhangs outwardly the upper rail of the lower sash, the sash being arranged in opposite vertical planes.

Certain well known faults are unavoidable in the common double-hung window, consisting in,—first, ineffective weathering of the window due to the fact that the sash must be free-fitting to permit of their slidable operation; second, incorrect ventilation, direct inward draughts resulting when the windows are opened; third, inconvenient for cleaning, due to the relative arrangement of the sash one to the other which makes the outer surface of the glass inaccessible except by the difficult and dangerous method of getting outside the window; fourth, obstructions of the sash by screens in the adjustments thereof for cleaning; fifth, sticking of the sash due to the weather variations of wood or to the application of paint; sixth, rattling of the windows due to free-fitting of the sash; seventh, ineffective closing or locking of the windows with the common type of window lock which can easily be released or forced from its fastenings; eighth, ineffectiveness of the windows to exclude dust and soot; ninth, ineffectiveness of the windows when open to exclude the weather in case of sudden storm, thus giving rise to the common experience of the weather blowing in on floors and furnishings; tenth, the lack of harmonious design, having reference to the overlapping meeting rails and the pronounced ledge produced by the inwardly exposed upper edge of the lower sash.

These common faults of ordinary double-hung windows are enumerated to establish a basis for considering the objects sought and attained in the invention herein set forth which are briefly enumerated as follows:

A double-hung window in which architectural distinctiveness is achieved,—the sash being on a straight line or in a common vertical plane, thus eliminating the objectionable overlapping meeting rails; the jamb and sill being of uniform depth and the window as a whole being constructed on symmetrical lines and having a panelled appearance;

Correct adjustment of the window for ventilating and to exclude the weather,—the lower sash being opened at the meeting rails and adjusted inwardly at a suitable angle which acts to deflect the fresh air upward and thus to prevent direct draughts through the window and also to exclude the weather at times of storm;

Effective weathering of the window without added material or cost of construction, this feature acting further to exclude dust and soot and adding measurably to cleanliness, comfort, and heating economy;

Convenient adjustment of the sash for cleaning on both sides from inside,—this feature eliminating at once the difficulty, drudgery and danger of window cleaning;

No obstruction or interference of the sash, as opened for cleaning, with screens;

No sticking or rattling of the sash;

Effective locking of the windows, interlocking of the sash with the frame being effected with the closing of the window without taking thought to do so, the locking mechanism being also effective to prevent forcing the window open from outside;

The improved window furthermore is adapted for convenient removal of the sash merely by disconnecting the weight cables, wire cables being used preferably because of their greater strength and durability, better appearance, and cleanliness. Thus the sash can readily be removed in sleeping rooms, sun rooms, etc., in the hot season, or for painting and repairs;

Means are also provided for locking the improved window in any position of vertical adjustment and in a plurality of positions of angular adjustment,—thus providing an added element of safety to upper story windows;

Means are provided for adjusting the window locking mechanism to maintain normal relation of the sash to the frame, having particular reference to the weather variations of wood windows;

In a preferred form of construction, provision is made for weathering the windows inside and out, which results in a practically air-tight construction and provides an innerfinishing moulding which serves to conceal the weight cables and adds materially to the good appearance of the window, means associated with the moulding being also provided to lock both sash in any position of vertical or angular adjustment and at the same time prevent rattling of the sash in open position.

In the accompanying drawings, the improved window is illustrated in both wood and metal construction, the principle of construction in wood and metal being substantially the same with minor modifications made to adapt the construction to the material,—the metal window being shown in a form adapted to solid sash, as distinguished from hollow sash, construction, it being understood that substantially the same construction shown will apply also to hollow sash metal windows.

In the drawings:

Figs. 19, 20 and 21 are detail views of a metal moulding suitable for both wood and metal windows;

Figs. 22, 23, 24 and 25 are detail views of the sash weight cable connections of the metal window;

The improved metal window, as shown in Figs. 1 to 4 inclusive, comprises upper and lower sash 1 and 2, opposite jambs 3, head 4 and sill 5 and the details of construction which make up the complete window, the structure as a whole being as follows:

*Upper sash.*—The upper sash comprises the opposite side rails 6, head rail 7 and lower meeting rail 8, the glass 9, upper and lower glass retainers 10 and 11 and opposite side glass retainers 12 (see Fig. 6), the retainers as here shown being yieldable and adapted to retain the glass under spring pressure applied thereon without the use of putty or cement. The sash is counterbalanced in the usual manner by means of opposite weights 13 connected to the sash by means of cables 14, a detail of the devices for connecting the cable to the sash being shown in Figs. 22–25, the device comprising parts 15 and 16 which are arranged one relative to the other on the order of a swivel, the outer member being adapted to receive the knotted end of the cable 14, the part having limited movement in a slot 17 of the inner member to provide for the angular adjustment of the sash.

Figure 9:
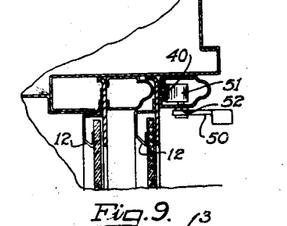
Fig. 9 is a detail cross sectional view of the sash moulding with the sash in the relation shown in Fig. 3.
Figure 10:
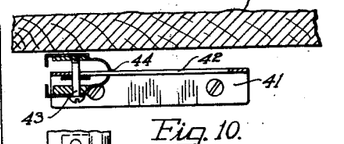
Figs. 10 and 11 are detail views of a preferred form of lower moulding guides.
Figure 11:
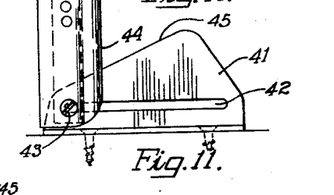

*Lower sash.*—The lower sash comprises the opposite side rails 18, upper rail 19, lower rail 20, the glass 21, upper and lower glass retainers 22 and 23 and opposite side glass retainers 12 which are of the same construction as the side glass retainers of the upper sash (see Fig. 9). The lower sash is counter-balanced by means of opposite weights 24 and cables 25 in the same manner as the upper sash, the cables being connected to the sash by means of the devices 15—16 as indicated at 26 in Fig. 4.

Figure 5:
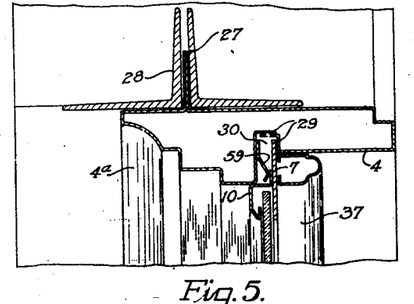
Fig. 5 is a detail cross sectional view of the head construction.

*Head construction.*—The head construction of the window, as here shown in Fig. 5, consists of the inner head member 4, an outer head or casing 4ª, arranged one relative to the other, as illustrated in the drawing to form a hollow structure, members 4 and 4ª being butted together at the top of the structure by means of flanges 27 interposed between opposite angle bars 28 which act to support the head firmly in the wall. On the lower side of the head, members 4—4ª overlap one another as indicated at 29, an off-set or air pocket 30 being formed outwardly adjacent the joint, into which the upper sash rail 7 and the glass retainer 10 project. The head members 4—4ª are formed, preferably, into an integral part by spot welding the joints 27 and 29, the head being also welded to the jambs and the jambs to the sill to form an integral part of the window frame as a whole.

Figure 6:
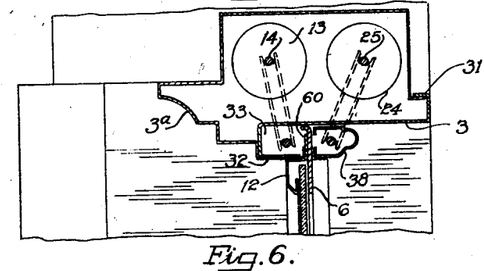
Fig. 6 is a detail cross sectional view of the jamb construction.

*Jamb construction.*—The jamb construction, as best shown in Fig. 6, consists of the inner jamb member 3 and an outer casing member 3ª which are shaped one relative to the other and welded together as at 31 and 32 to form a hollow housing for the weights 13—24, the inner terminal of part 3 being U-shaped to form an air space 33 outwardly adjacent the side sash rails 6 and 18 which extend over the open side of the U-shaped formation.

Figure 8:
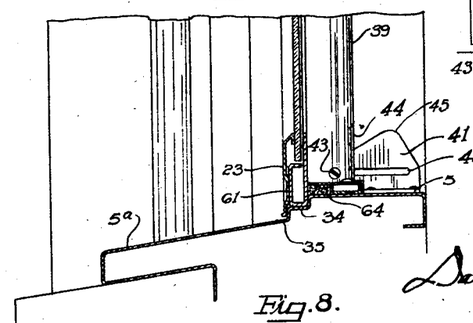
Fig. 8 is a detail cross sectional view of the sill construction.

*Sill construction.*—The sill construction, as best shown in Fig. 8, consists of a one-piece member which is shaped to form the inner sill 5 and the outer sill 5ª, the metal being shaped as at 34 to form the seat for the lower sash, and as at 35, to provide for weathering the sash on the sill line.

Figure 7:
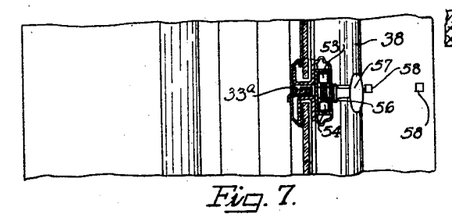
Fig. 7 is a detail cross sectional view of the meeting rail construction.
Figure 12:
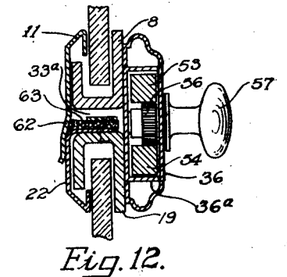
Fig. 12 is a detail cross sectional view of the meeting rails.

*Meeting rail construction.*—The meeting rail construction, as best shown in Fig. 7, and enlarged detail Fig. 12, consists of the lower sash rail 8, the upper sash rail 19 and a hollow moulding comprising parts 36 and 36ª which overlap the meeting rail joint and provide a housing, extending transversely of the window, for the window locking mechanism.

*Sash mouldings.*—The upper sash is provided with a head moulding 37 and opposite side mouldings 38 (see Figs. 1, 5 and 6) which are fastened to the window jamb, the mouldings being hollow and designed to give artistic finish to the window.

Figures 2, 3:
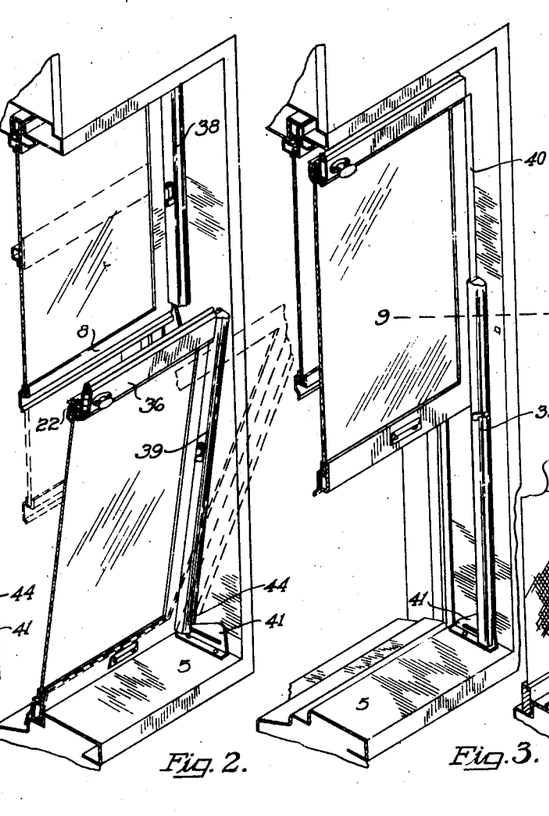
Fig. 2 is a view of the window as shown in Fig. 1, with the lower sash adjusted at an angle for ventilating.
Fig. 3 is a view of the window with the lower sash in full-open vertical position.

The lower sash is provided with opposite side mouldings 39, matching the mouldings 38, which are operably connected to the sash by means of a double-flanged bead 40 (see Figs. 4 and 9) secured to the sash, in a manner to adapt the sash to slide on the mouldings in the vertical adjustment of the sash, as illustrated in Figs. 3 and 9.

To provide for the vertical and angular adjustments of the lower sash, the mouldings 39 are connected slidably at their lower ends to the window sill by means of plates 41 having slots 42 adapted to be engaged by a pin 43 in the lower ends of the mouldings to prevent vertical movement of the mouldings with the sash. The mouldings are pivotally connected to plates 41 by means of the pins 43, the mouldings being slotted as at 44 to clear plates 41 to permit of the inward movement of the moulding and angular adjustment of the sash to the positions shown in Figs. 2 and 3. As the sash is moved inwardly to the position of the moulding illustrated in Fig. 3, the lower edge of the sash slides on the angular edge 45 of plate 41, thus effecting an easy movement of the sash. When the sash is lowered, the lower edge again engages the angular edge 45 of plate 41 which acts to guide the lower portion of the sash outwardly in an easy closing movement.

Figures 28, 29, 30, 31, 32:
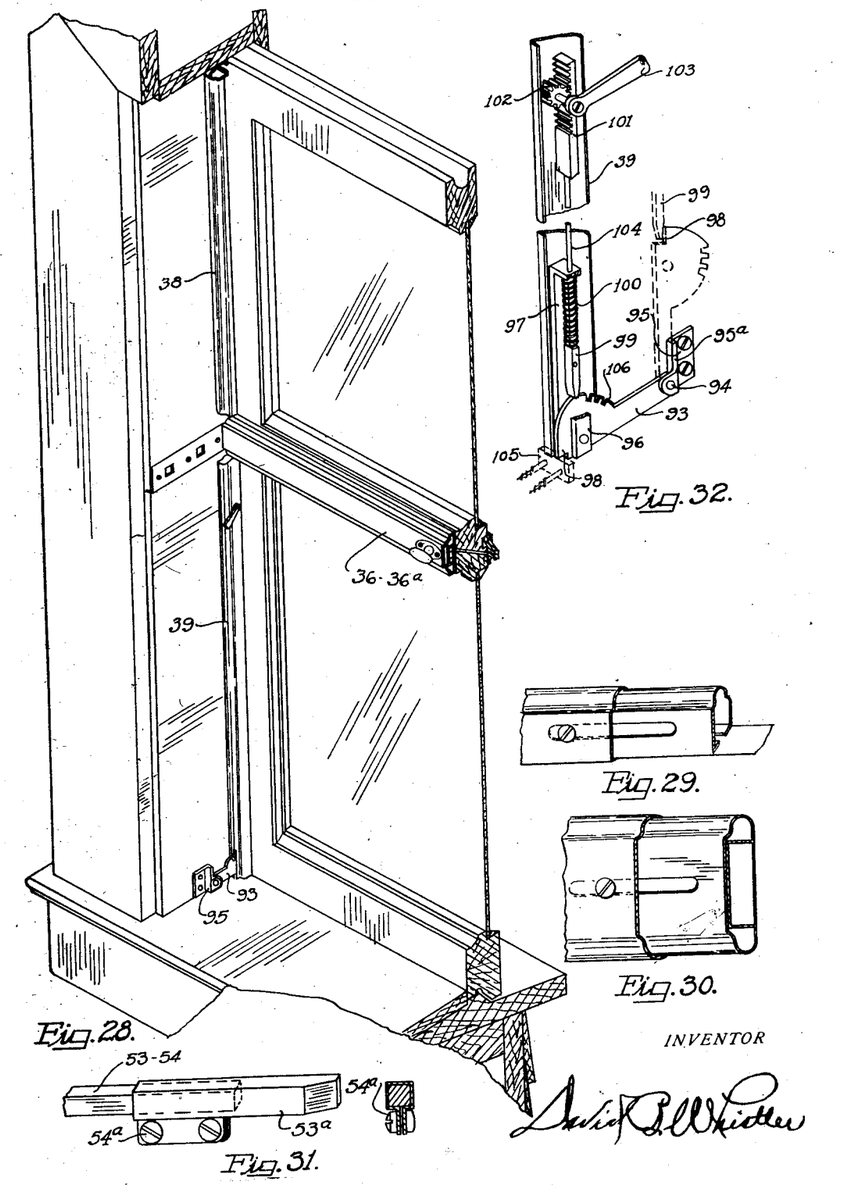
Fig. 28 is a perspective view in vertical section of a metal trimmed wood window.
Figs. 29 and 30 are detail views of the metal mouldings, or trim, illustrating a form of expansion joints.
Fig. 31 is a detail view of an adjustable form of the window latch bolts.
Fig. 32 is a detail assembly view of controlling mechanism for the lower sash mouldings in a modified form.

In the modified moulding connection illustrated in Fig. 32 provision is made for holding the lower ends of mouldings 39 against lateral displacement in a turning movement on pivot centers 96, when the sash is adjusted vertically by providing link 93 with a shoulder 98 which is adapted to be engaged by a spring-tensioned latching member 99 slidably supported in bracket 97 and held in contact with link 93 under pressure of a spring 100, thus acting to prevent turning of the moulding on pivot center 96 in one direction, a shoulder 95ª of bracket 95 acting as a limit stop for link 93 and the moulding in the opposite direction. Means for controlling the latching member 99 manually are provided at the upper end of one of the mouldings 39, comprising a rack 101, a pinion 102 meshing with the rack, and a finger piece 103 for operating the pinion, the rack being connected to member 99 by a rod 104. When the sash is in normal closed relation, the lower moulding mechanism will be in the relation illustrated in the full line position in Fig. 32, and when in vertical open position, as illustrated in Fig. 3, the parts will be in the relation shown in the dotted outline in Fig. 32. To close the window from the latter position, the latch 99 will first be moved by manipulation of the finger piece 103 to disengage notch 98 when the sash together with the mouldings will be free to be moved laterally outwardly to closed position.

Figure 1:
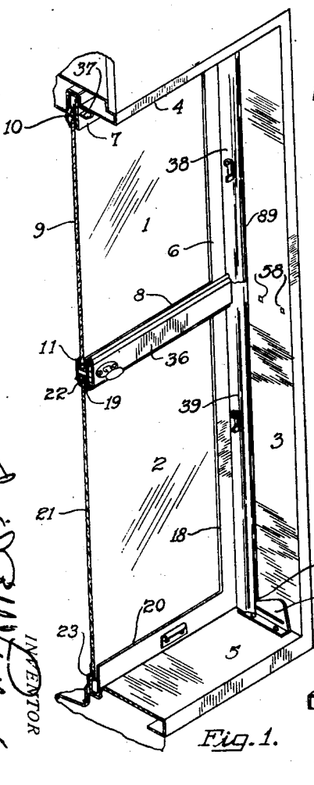
Fig. 1 is a perspective view of the improved metal window in longitudinal section, both sash being in closed relation.

When the sash is moved from the position illustrated in Fig. 1 to the position in Fig. 3, the sash and mouldings 39 move as a unit, this being effected by means of lugs 105 secured to the lower corners of the sash, as illustrated in Fig. 32, which act to engage shoulders 98 and to prevent sliding movement of the sash on the mouldings until the vertical position of sash and mouldings illustrated in Fig. 3 is approached when lug 105 will clear the shoulder and the sash will be free to slide on the moulding. When the sash is lowered the parts will again be brought into coactive relation to permit the lug to clear the shoulder for the outward pivotal movement of the sash. One of the links 93 is also provided with notches 106 adapted to be engaged by the latching member 99 and thus to serve as a means for holding the lower sash in any one of a number of selectable positions in the inward angular adjustment of the sash beyond the window frame. In this relation also the latch mechanism will be releasable by manipulation of part 103.

Suitable means, as cam friction latches, shown in detail in Fig. 9, are provided for holding both the upper and lower sash in any position of vertical adjustment, the mechanism consisting of an eccentric cam member 51 secured to a stem 52 supported in the mouldings and adapted to be manipulated by means of a lever finger piece 50 to effect and release the frictional holding relation between the eccentric member and the bead 40 of the lower sash and direct with the sash rail of the upper sash.

Figures 13, 14, 15, 16, 17, 18:
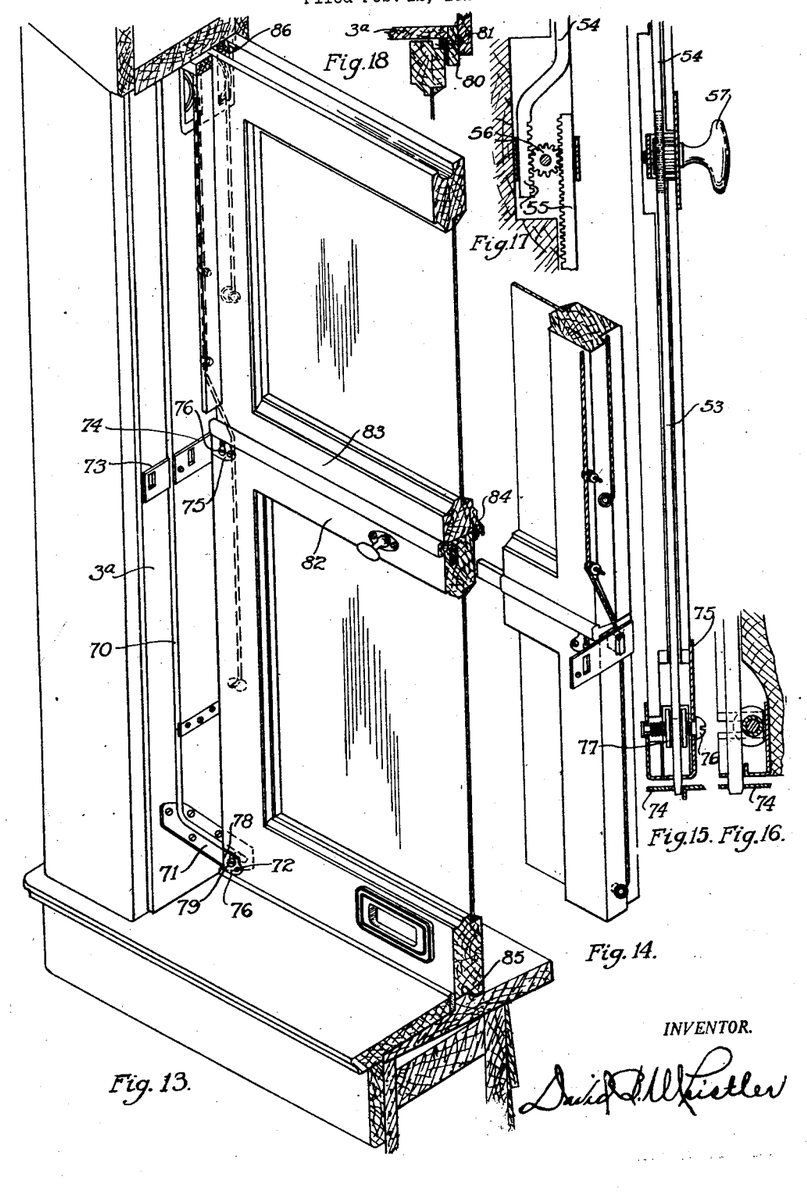
Fig. 13 is a perspective view in longitudinal section of the window in all wood construction.
Figs. 14 to 17 are detail views of the locking mechanism as used on the all wood window.
Fig. 18 is a detail of weathering of the all wood window.
Figures 19, 20, 23:
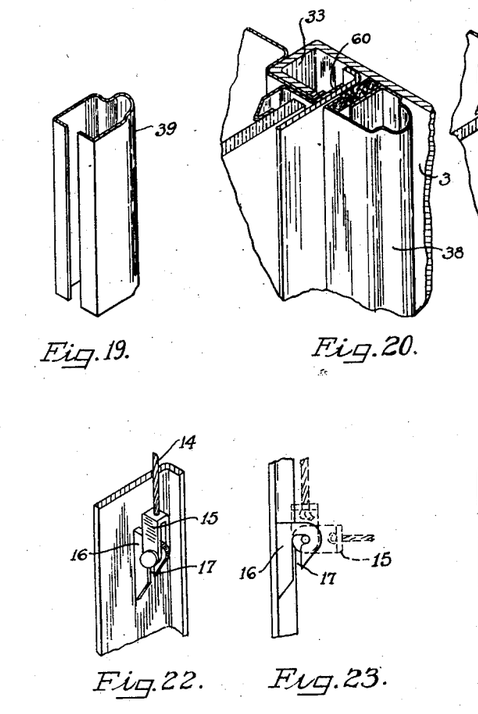
Figure 21:
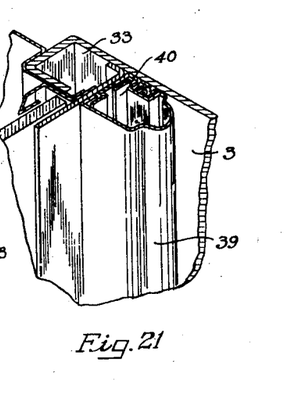
Figure 24:
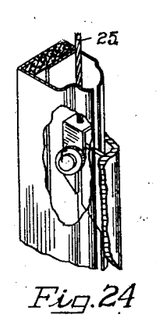
Figure 25:
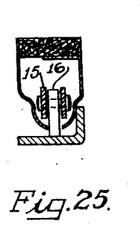

*Locking mechanism.*—The window locking mechanism consists of oppositely projectable latch bars 53—54 operable in the meeting rail housing 36—36ª, the bars being provided with racks 55 at their inner ends meshing with a spur gear 56 secured to a finger piece 57 by means of which the latch bars are projected and retracted, one of the racks engaging gear 56 on one side and the other rack on the opposite side, as illustrated in Fig. 17, being thus adapted to be projected and retracted coactively one with the other.

As shown in Fig. 1, a series of apertures 58 are provided in the opposite jambs 3 which are adapted to be engaged by the outer ends of the latch bars, thus to effect interlocking of the lower sash with the jambs, as illustrated in Figs. 15 and 16. It will be observed that the engaging ends of the latch bars are tapered on one side which acts, when the bars are in engagement with the outer apertures 58, which is the closed position of the sash, to force both sash outward by a wedging action firmly into contact along the weather line of the sash with the U-shaped portions 33 of the jambs, the upper sash being forced outward by the lower sash by reason of the contact therewith of the meeting rail housing 36—36ª. This arrangement is effective to maintain a tight fitting relation between the sash and the jambs on the weather line and also to hold the sash rigidly in closed relation and thus to prevent play or rattling of the sash.

*Outside weathering.*—The provision for effective outside weathering of the window consists in the means for interlocking the sash with the frame and for producing the outward pressure of the sash against the jambs or weather bead described in the preceding paragraph, and in added weathering elements 59 employed in the head construction, outwardly extended portions 60 of the opposite side glass retainers 12 coacting with the side rails of the sash and the U-shaped portion of the jambs, a downwardly extended portion 61 of the glass retainer 23 of the lower sash, a downwardly extended portion 62 of the glass retainer 11 of the upper sash, and a liner element, as felt or rubber fabric, 63 interposed between the meeting rails 8 and 19. (See Fig. 12).

These yieldable, or spring-tensioned elements are arranged along the joints of the coacting parts of sash and frame in a manner to effect complete contacts on the weather lines, the weathering elements yielding sufficiently outwardly under pressure of the sash to cause full contact to be made between the coacting parts along the entire weather line of all the joints. Furthermore, the dead air pockets 30 and 33, and 33ª at the meeting rails, act to smother or neutralize any seepage of air through the outer line of contacts.

*Inside weathering.*—Further means of weathering the window inside are also provided in certain constructions, in connection with the mouldings 37, 38 and 39 and a still weathering 64,—the means consisting in combining with the mouldings a lining element, as felt or other suitable linings 65, 66, 67 and 68, in a manner to effectively seal from inside all joint crevices as the window is closed and thus to render the entire window practically air tight and dust and soot proof. It will be observed that the weathering element associated with the operable mouldings 39 are secured to the mouldings and therefore remain with the mouldings as the sash is operated.

It will be obvious that the outside and inside means for weathering the windows may be used jointly or independently one of the other.

*Wood construction.*—The all wood window construction illustrated in Fig. 13 and in detail Figs. 14 to 18 differs from the metal window construction illustrated in Figs. 1 to 12, only in detail features which adapt the principle of the invention to the different materials.

A main feature of distinction, as shown in Fig. 13, consists of a vertically extended groove 70 in the jambs 3ª of the window frame which acts to deflect the lower sash inwardly for vertical adjustments, the slotted plates 71 and a pivot stud 72 secured to the sash acting to guide the lower course of the sash.

It will be obvious that the mouldings 38 and 39 can be applied in the wood construction as readily and as effectively as in the metal construction, and therefore, that the mouldings and the grooves 70 are more or less equivalent means with respect to performing the function of deflecting the sash to a plane parallel to that of the upper sash and also for controlling the lower portion of the sash.

Figure 26:
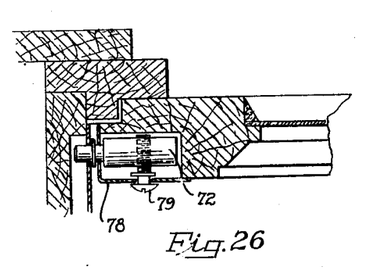
Figs. 26 and 27 are detail views of additional features of the wood window adjusting devices.
Figure 27:
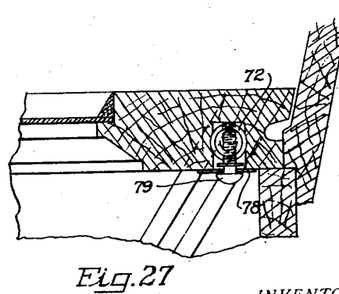

In view of the wood construction, latch plates 73—74 are secured to the jambs to receive the ends of the latch bars, and adjusting devices comprising upper sash corner plates 75, an adjusting screw 76 and a flanged saddle 77 for engaging the latch bars, are provided for adjusting the bars laterally to adapt the same to weather variations of the wood. In like manner and for the same purpose, the pivot stud 72 is adapted to be adjusted laterally in lower sash corner plates 78 by means of adjusting screws 79. (See Figs. 26 and 27).

*Weathering of the wood window.*—The wood window, as the metal window, lends itself to effective weathering in its regular construction, i. e., without the application of any of the well-known forms of weather stripping which are applied after windows are installed. In the wood construction, the sash are forced outwardly firmly into engagement with the rabbeted weather beads 80 which form part of the jambs 3ª (see Fig. 18) by the wedging action of the latch bars, dead air spaces 81 being formed between the weather bead and the adjacent rabbeted edges of the sash in the same manner and with the same result as in the metal construction. The meeting rails 82 and 83 are provided with an outer drip strip 84 which overlaps and closes the meeting rail joint, the lower sash rail at the sill being also rabbeted and provided with an air space as at 85, and the upper sash rail provided with a tongue-and-groove 86,—the window as a unit being thus completely weathered on the four edges exposed on the weather line.

The modified construction illustrated in Fig. 28 is an adaptation of the construction of the metal window illustrated in Figs. 1 to 4 to wood construction, the features of adaptation consisting of the mouldings 38—39, meeting rail parts 36—36ª, and the moulding pivot mechanism illustrated in Fig. 32. These features of similarity enable the standardization of the metal trim for both wood and metal windows and simplify and cheapen production of the product.

A further step of standardization of the window is gained by providing the mouldings and the meeting rail with expansion joints, the coacting parts being arranged telescopically one relative to the other, as illustrated in Figs. 29 and 30. For the same purpose, latch bars 53—54 are also made expandible by means of an extension 53ª adapted to slide on the bars telescopically and to be secured to the bars in any position of adjustment by clamp screws 54ª. These provisions adapt the parts to windows of variable sizes in height and width and greatly simplify and cheapen production by standardizing construction.

*Operation of the windows.*—As illustrated in Figs. 1 to 4, both sash are adapted for both vertical and angular adjustments. For normal ventilation, the lower sash is adjusted to a selected position, as illustrated in Fig. 2, in which position it is adapted to be firmly interlocked with the frame by means of the latch bolts. It will be observed that the air will be deflected upward and that the adjustment of the sash will be effective to prevent direct draughts through the window, and also to exclude the weather. If more ventilation is desired, the upper sash is adapted to be lowered to any desired extent, or the lower sash can be adjusted at a greater angle, as indicated in the dotted outline position of the sash in Fig. 2.

The lower sash is also adapted to be raised to full-open position, as indicated in Fig. 3, and to be locked, or securely held in any position of vertical adjustment by means of the holding devices 50—51. It will be observed in the figure, that the lower sash is substantially higher than the upper sash, the difference of dimensions being of advantage in the operation of the sash one relative to the other.

Figure 4:
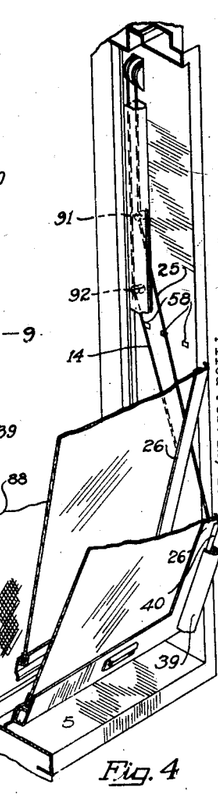
Fig. 4 is a view of the window with both sash partially opened for cleaning.

In Fig. 4 the sash are illustrated partially adjusted for cleaning or to effect full opening of the window. Both sash have an inward angular adjustment which makes the outside of the sash conveniently accessible for cleaning, and provides for maximum ventilation in hot season. It will also be observed in Fig. 4 that a screen 88 is in position in the window opening and that there is no interference between the screen and sash.

To adapt the sash weight cables 25 to pass outwardly free of mouldings 38, the mouldings are provided on their inner edge with slots 89, the cables being concealed in the mouldings when the window is closed. The cables for both sash operate over sheaves 90 and over guide rollers 91 and 92 respectively concealed in mouldings 38, the arrangement being adapted to easy operation of the sash and to neatness of construction.

Having described my invention, I claim:

1. A window including in combination a plurality of sash and mouldings slidably connected to a face of a sash and operable therewith to adapt the sash to be adjusted laterally and vertically one relative to another.

2. A window including in combination a plurality of sash and face mouldings connected to a sash and operable angularly and slidably therewith to adapt the sash to be adjusted vertically one relative to another.

3. A window including in combination, a plurality of sash, face mouldings connected to a sash and operable laterally and slidably therewith to adapt the sash to be adjusted vertically one relative to another, and means associated with one of said mouldings to secure the adjusted sash in selective positions.

4. A window including in combination, a plurality of sash and mouldings connected pivotally and slidaby to the opposite inner edges of a sash and operable laterally therewith to adapt the sash to be adjusted one relative to another.

5. A window including in combination with the frame, a plurality of sash and face mouldings connected slidably to the opposite inner edges of a sash and adjustable variably angularly with the sash into selective relation with said frame, and laterally of the frame, to adapt the sash to be adjusted vertically one relative to another.

6. A window including in combination with the frame, a plurality of sash arranged normally in a common vertical plane, and mouldings connected slidably to opposite inner edges of a sash and pivotally to said frame to adapt said sash to be adjusted laterally and vertically.

7. A window including in combination with the frame, a plurality of sash arranged normally in a common vertical plane and mouldings connected slidably to opposite inner edges of a sash and pivotally to the frame to adapt said sash to be adjusted angularly, laterally and vertically.

8. A window including in combination with the frame, a plurality of sash arranged normally in a common vertical plane, and mouldings connected slidably to opposite inner edges of a sash and pivotally to the frame to adapt said sash and mouldings to be adjusted laterally to permit vertical adjustments of the sash, and means to retain the mouldings in stationary relation relative to the frame as said vertical adjustment of the sash is effected.

9. A window including in combination with the frame, a plurality of sash arranged normally in a common vertical plane, and mouldings connected slidably to opposite inner edges of a sash and connected pivotally and slidably to the frame whereby said sash and mouldings are adapted to be moved laterally to permit vertical adjustment of the sash, and means to retain the mouldings yieldingly in stationary relation to the frame as said vertical adjustment of the sash is effected.

10. A window including in combination with the frame, a plurality of sash arranged normally in a common vertical plane, transversely extended guides supported on said frame on opposite sides thereof, and opposite face mouldings connected to the lower sash and operable slidably in said guides to deflect the sash inwardly to adapt the same to be adjusted vertically.

11. A window including in combination with the frame, a plurality of sash arranged normally in a common vertical plane, guides supported on said frame on opposite sides thereof and mouldings connected to the opposite edges of a sash and operable slidably in said guides to deflect said sash laterally to adapt the same to be adjusted vertically, and spring-tensioned elements associated with said guides acting to retain said mouldings yieldingly in stationary relation with the frame as said vertical adjustment of the sash is effected.

12. A window including in combination with the frame, a plurality of sash arranged normally in a common vertical plane, guides supported on said frame on opposite sides thereof, mouldings connected to the opposite edges of one sash and operable pivotally and slidably in said guides to deflect said sash laterally to adapt the same to be adjusted vertically.

13. A window including in combination with the frame, a plurality of sash arranged normally in a common vertical plane, guides supported on said frame on opposite sides thereof, mouldings connected to the opposite edges of a sash and operable pivotally and slidably in said guides to deflect said sash laterally to adapt the same to be adjustable vertically and means associated with said mouldings and guides acting to press said sash outwardly when the same is in closed relation.

14. A window including in combination with the frame, a plurality of sash arranged normally in a common vertical plane, guides supported on said frame on opposite sides thereof, mouldings connected to the opposite edges of a sash and operable pivotally and slidably in said guides to deflect said sash laterally to adapt the sash to be adjusted vertically one relative to another, and spring-tensioned elements coacting with said mouldings and guides to press said sash outwardly yieldingly when the sash are in closed relation.

15. A window including in combination with the frame, a plurality of sash arranged normally in a common vertical plane, slotted guide plates supported on said frame on opposite sides thereof, mouldings connected to the opposite edges of a sash and operable pivotally and slidably in the slots of said plates to deflect the sash inwardly, and spring-tensioned elements associated with said slots adapted to retain the mouldings in said position in stationary relation with the frame.

16. A window including in combination with the frame, a plurality of sash arranged normally in a common vertical plane, guides having extended terminals supported on opposite sides of said frame, mouldings connected to the opposite edges of a sash and operable in said guides to deflect the sash laterally and means associated with said terminals to retain the mouldings yieldingly relative to the frame.

17. A window including in combination with the frame, a plurality of sash arranged normally in a common vertical plane, separate, vertically aligned face mouldings arranged inwardly adjacent each sash, the upper mouldings being fixed to the frame and the lower mouldings connected slidably to the lower sash and operable therewith laterally to adapt the sash to be adjusted vertically one relative to another.

18. A window including in combination with the frame, a plurality of sash arranged normally in a common vertical plane, separate, vertically aligned mouldings arranged inwardly adjacent each sash, the upper mouldings being fixed to the frame, and the lower mouldings connected slidably to the lower sash and adjustable laterally with the sash to adapt the sash for vertical adjustment, and a weathering element associated with said mouldings.

19. A window including in combination with the frame, a plurality of sash operable in the frame, means comprising latch bars supported on one of the sash and projectable to interlock the sash with the frame, and means comprising supporting brackets secured to said sash and acting as a guard or keeper for the projectable ends of said bars, and bar adjusting screws supported in said brackets and connected with said ends whereby, upon adjustment of the screws, said bars will be moved laterally to compensate for variations between the sash and frame.

20. A window including a sash adjustable laterally and slidably in a frame, a member operably associated with the sash and acting to support the same free to the frame in said adjustments thereof.

21. A window including a sash adjustable laterally and slidably in a frame, a member operable slidably relative to the sash and adjustable laterally with the sash relative to the frame and acting to support the sash free of the frame in said adjustments thereof.

22. A window including a sash adjustable laterally and slidably in a frame, a bead secured to the sash and a moulding arranged telescopically and operable slidably relative to said bead and laterally relative to said frame and acting to support the sash free of the frame in said adjustments thereof.

23. A window including upper and lower vertically aligned sash, divided mouldings arranged along the inner vertical edges of the sash, the mouldings being in vertical alignment one part with another as the window is closed, the upper mouldings being secured to the window frame and the lower mouldings to the lower sash and movable therewith laterally for deflecting the sash out of the plane of the upper sash.

24. A window including upper and lower vertically aligned sash, divided mouldings arranged along the inner vertical edges of the sash, the mouldings being in vertical alignment one part with another as the window is closed, the upper mouldings being secured to the window frame and the lower mouldings to the lower sash and movable therewith laterally for deflecting the sash out of the plane of the upper sash, and a meeting rail moulding fixed to the lower sash and having its opposite ends interposed between the parts of the vertical mouldings.

25. A window including upper and lower vertically aligned sash, divided mouldings arranged along the inner vertical edges of the sash, the mouldings being in vertical alignment one part with another as the window is closed, the upper parts being secured to the window frame and the lower parts to the lower sash and movable laterally therewith for deflecting the sash out of the plane of the upper sash, a meeting rail moulding fixed to the lower sash and having its opposite ends interposed between the parts of the vertical mouldings, latching members projectable axially oppositely in the meeting rail moulding, and latch plates fixed on the window frame for coacting with said members for securing the window.

26. A window including upper and lower, counter-balanced sash vertically aligned one with another, divided mouldings arranged along the inner vertical edges of the sash, the mouldings being in vertical alignment one part with another as the window is closed, the upper parts being secured to the window frame and serving as passages for the lower sash cords, and the lower parts connected slidably to the lower sash and movable laterally therewith for deflecting the sash out of the plane of the upper sash, a meeting rail moulding fixed on the face of the lower sash and overlapping the lower edge of the upper sash with its opposite ends interposed between the parts of the vertical mouldings, latching members projectable axially oppositely in the meeting rail moulding, and latch plates fixed on the opposite window jambs coacting with said members for exerting outward pressure on the sash for securing the window.

In testimony whereof, I affix my signature.

DAVID B. WHISTLER.